United States Patent
Pau et al.

(10) Patent No.: US 6,545,727 B1
(45) Date of Patent: Apr. 8, 2003

(54) METHOD FOR RECOGNIZING A PROGRESSIVE OR AN INTERLACED CONTENT IN A VIDEO SEQUENCE

(75) Inventors: Danilo Pau, Sesto San Giovanni (IT); Luca Pezzoni, Cormano (IT); Fabrizio Rovati, Cinisello Balsamo (IT); Daniele Sirtori, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 278 days.

(21) Appl. No.: 09/654,591

(22) Filed: Sep. 1, 2000

(30) Foreign Application Priority Data

Sep. 3, 1999 (EP) .............................. 99830545

(51) Int. Cl.[7] ................................ H04N 5/14
(52) U.S. Cl. ................... 348/700; 375/240.26
(58) Field of Search ................ 348/700, 441, 348/558, 554, 449, 459, 714, 718; 375/240.26

(56) References Cited

U.S. PATENT DOCUMENTS

| 5,828,786 A | 10/1998 | Rao et al. ................... 382/236 |
| 6,064,450 A | * 5/2000 | Canfield et al. ............. 348/845 |

FOREIGN PATENT DOCUMENTS

| EP | 536784 | 4/1993 | ............. H04N/7/13 |
| EP | 538834 | 4/1993 | ............. H04N/7/13 |
| EP | 673169 | 9/1995 | ............. H04N/7/26 |
| EP | 923250 | 6/1999 | ............. H04N/7/26 |

\* cited by examiner

*Primary Examiner*—Victor R. Kostak
(74) *Attorney, Agent, or Firm*—Allen, Dyer, Doppelt, Milbrath & Gilchrist, P.A.

(57) ABSTRACT

A method for recognizing a progressive or an interlaced content of video pictures during their processing in a coder includes performing a number of operations on at least one of the luminance or chrominance components of the video signal. A macroblock belonging to a frame of a preceding picture is defined, and a first pair of coefficients on the selected luminance or chrominance component of the video signal is calculated. A first counter is incremented at each positive verification when one of the coefficients is greater than the other coefficient by a determined amount. A second counter is incremented at each macroblock being tested. A second pair of coefficients is calculated for each row of each Top semi-frame. A third counter is incremented at each positive verification when one of the coefficients is greater than the other coefficient by a determined amount. A fourth counter is incremented at each row tested. Verification is made as to whether a content of the first counter is greater than a content of the second counter by a determined amount, and whether, at a same time, a content of the third counter is greater than a content of the fourth counter by a determined amount. If so, then the frame composed of the Top and Bottom semi-frames of the current picture is an interlaced frame, and if not, then the frame is a progressive frame.

31 Claims, 5 Drawing Sheets

METHOD FOR RECOGNIZING A PROGRESSIVE OR AN INTERLACED CONTENT IN A VIDEO SEQUENCE

FIELD OF THE INVENTION

The present invention relates to digital decoders of sequences of video images, and, more particularly, to a method for recognizing the progressive or interlaced content of an image to improve the effectiveness of the video coding for low cost applications. Due to the importance of the MPEG standard in treating digitized video sequences, reference will be made to an MPEG2 system to illustrate the present invention. The present invention is also applicable to systems that transfer video sequences based on different standards.

BACKGROUND OF THE INVENTION

The MPEG (Moving Pictures Experts Group) standard defines a set of algorithms dedicated to the compression of sequences of digitized pictures. These techniques are based on the reduction of the spatial and temporal redundance of the sequence. Reduction of spatial redundance is achieved by compressing independently the single images via quantization, discrete cosine transform (DCT) and Huffman coding.

The reduction of temporal redundance is obtained using the correlation that exist between successive pictures of a sequence. Each image can be expressed locally as a translation of a preceding and/or successive image of the sequence. To this end, the MPEG standard uses three kinds of pictures; I (Intra Coded Frame), P (Predicted Frame) and B (Bidirectionally Predicted Frame). The I pictures are coded in a fully independent mode. The P pictures are coded with respect to a preceding I or P picture in the sequence. The B pictures are coded with respect to two pictures of the I or P kind, which are the preceding one and the following one in the video sequence (see FIG. 1).

A typical sequence of pictures can be I B B P B B P B B I B . . . , for example. This is the order in which they will be viewed. Given that any P is coded with respect to the preceding I or P, and any B is coded with respect to the preceding and following I or P, it is necessary that the decoder receive the P pictures before the B pictures, and the I pictures before the P pictures. Therefore, the order of transmission of the pictures will be I P B B P B B I B B . . .

Pictures are processed by the coder sequentially, in the indicated order, and are successively sent to a decoder which decodes and reorders them, thus allowing their successive displaying. To code a B picture it is necessary for the coder to keep in a dedicated memory buffer, called frame memory, the I and P pictures, coded and thereafter decoded, to which current B picture refers, thus requiring an appropriate memory capacity.

One of the most important functions in coding is motion estimation. Motion estimation is based on the following consideration. A set of pixels of a frame of a picture may be placed in a position of the successive picture obtained by translating the preceding one. These transpositions of objects may expose parts that were not visible before as well as changes of their shape, such as during a zooming, for example.

The family of algorithms suitable to identify and associate these portions of pictures is generally referred to as motion estimation. Such an association of pixels is instrumental to calculate a difference picture removing redundant temporal information, thus making more effective the successive processes of DCT compression, quantization and entropic coding.

Figure 1:
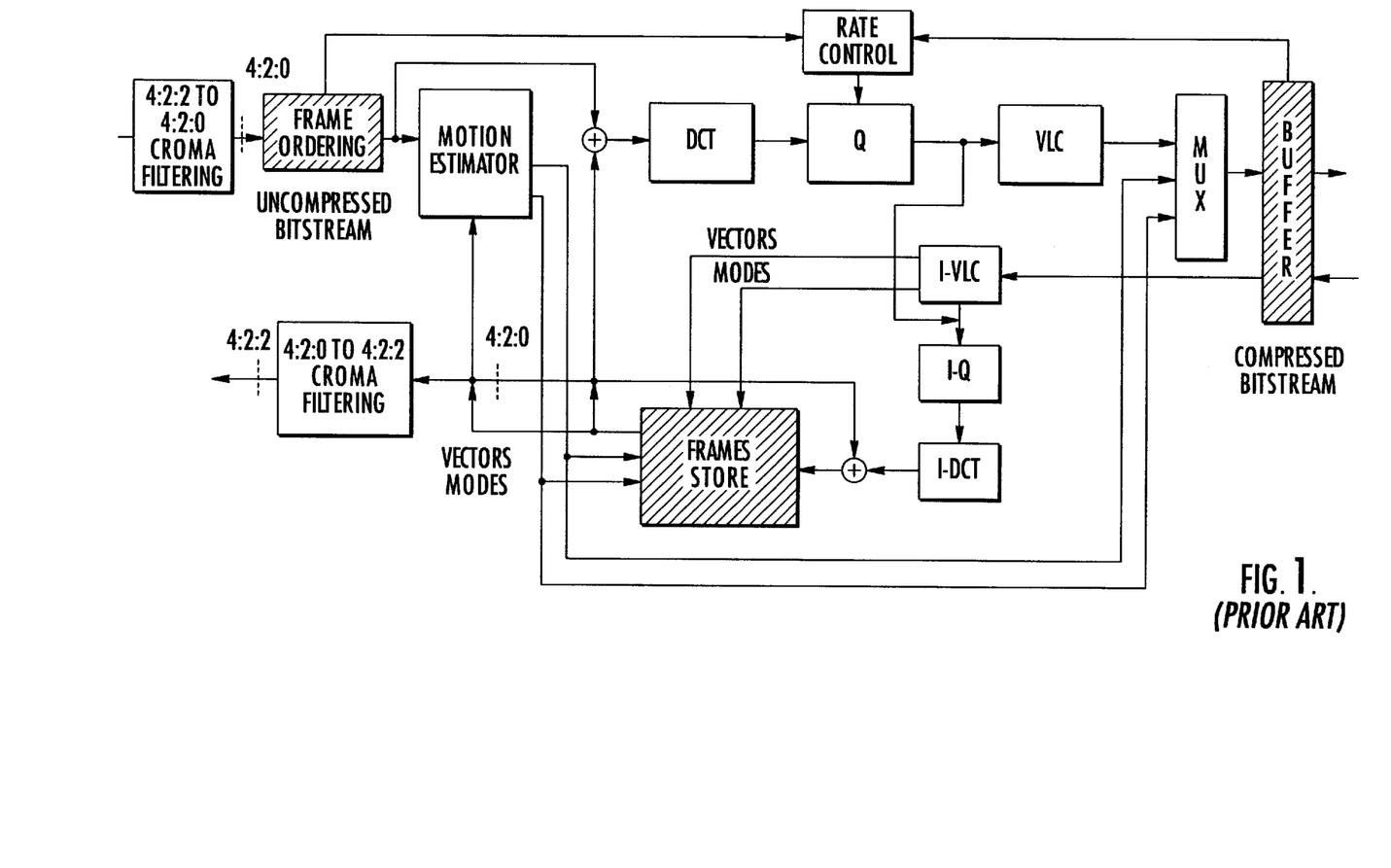
FIG. 1 shows a basic scheme of an MPEG2 video decoder containing a Motion Estimator block in accordance with the prior art.

A typical example of a system using this method may be illustrated based upon the MPEG-2 standard. A typical block diagram of a video MPEG-2 coder is depicted in FIG. 1. Such a system is made of the following functional blocks:

1) Chroma filter block from 4:2:2 to 4:2:0. In this block there is a low pass filter operating on the chrominance component, which allows the substitution of any pixel with the weighed sum of neighboring pixels placed on the same column and multiplied by appropriate coefficients. This allows a successive subsampling by two, thus obtaining a halved vertical definition of the chrominance.

2) Frame ordinator. This blocks is composed of one or several frame memories outputting the frames in the coding order required by the MPEG standard. For example, if the input sequence is I B B P B B P etc., the output order will be I P B B P B B . . .

The Intra coded picture I is a frame or a semi-frame containing temporal redundance. The Predicted-picture P is a frame or semi-frame from which the temporal redundance with respect to the preceding I or P (precedingly co/decoded) has been removed. The Biredictionally predicted-picture B is a frame or a semi-frame whose temporal redundance with respect to the preceding I and successive P (or preceding P and successive P) has been removed. In both cases the I and P pictures must be considered as already co/decoded.

Each frame buffer in the format 4:2:0 occupies the following memory space:

| Standard PAL | | |
|---|---|---|
| 720 × 576 × 8 for the luminance | (Y) = | 3,317,760 bits |
| 360 × 288 × 8 for the chrominance | (U) = | 829,440 bits |
| 360 × 288 × 8 for the chrominance | (V) = | 829,440 bits |
| total | Y + U + V = | 4,976,640 bits |
| Standard NTSC | | |
| 720 × 480 × 8 for the luminance | (Y) = | 2,764,800 bits |
| 360 × 240 × 8 for the chrominance | (U) = | 691,200 bits |
| 360 × 240 × 8 for the chrominance | (V) = | 691,200 bits |
| total | Y + U + V = | 4,147,200 bits |

3) Estimator. This is the block that removes the temporal redundance from the P and B pictures. This functional block operates only on the most energetic component, and, therefore, the richest of information of the pictures which compose the sequence to code, such as the luminance component.

4) DCT. This is the block that implements the discrete cosine transform according to the MPEG-2 standard. The I picture and the error pictures P and B are divided in blocks of 8*8 pixels Y, U, and V on which the DCT transform is performed.

5) Quantizer Q. An 8*8 block resulting from the DCT transform is then divided by a quantizing matrix to reduce the magnitude of the DCT coefficients. In such a case, the information associated to the highest frequencies, less visible to human sight, tends to be removed. The result is reordered and sent to the successive block.

6) Variable Length Coding (VLC). The codification words output from the quantizer tend to contain a large number of null coefficients followed by nonnull values. The null values preceding the first nonnull value are counted and the count figure forms the first portion of a codification word, the second portion of which represents the nonnull coefficient.

These pairs tend to assume values more probable than others. The most probable ones are coded with relatively short words composed of 2, 3 or 4 bits while the least probable are coded with longer words. Statistically, the number of output bits is less than in the case such a criteria is not implemented.

7) Multiplexer and buffer. Data generated by the variable length coder, the quantizing matrices, the motion vectors and other syntactic elements are assembled for constructing the final syntax contemplated by the MPEG-2 standard. The resulting bitstream is stored in a memory buffer, the limit size of which is defined by the MPEG-2 standard requirement that the buffer cannot be overfiled. The quantizer block Q attends to such a limit by making the division of the DCT 8*8 blocks dependent upon how far the system is from the filling limit of such a memory buffer and on the energy of the 8*8 source block taken upstream of the motion estimation and DCT transform steps.

8) Inverse Variable Length Coding (I-VLC). The variable length coding functions specified above are executed in an inverse order.

9) Inverse Quantization (IQ). The words output by the I-VLC block are reordered in the 8*8 block structure, which is multiplied by the same quantizing matrix that was used for its preceding coding.

10) Inverse DCT (I-DCT). The DCT transform function is inverted and applied to the 8*8 block output by the inverse quantization process. This permits passing from the domain of spatial frequencies to the pixel domain.

11) Motion Compensation and Storage. At the output of the I-DCT, the following may be present. A decoded I frame (or semiframe) that must be stored in a respective memory buffer for removing the temporal redundance with respect thereto from successive P and B pictures. A decoded prediction error frame (or semiframe) P or B that must be summed to the information precedingly removed during the motion estimation phase. In case of a P picture, such a resulting sum, stored in dedicated memory buffer is used during the motion estimation process for the successive P pictures and B pictures. These frame memories are distinct from the frame memories that are used for re-arranging the blocks.

12) Display Unit from 4:2:0 to 4:2:2. This unit converts the frames from the format 4:2:0 to the format 4:2:2 and generates the interlaced format for the successive displaying. The chrominance components eliminated by the chroma filter block are restored by interpolation of the neighboring pixels. The interpolation includes in a weighed sum the neighboring pixels for appropriate coefficients, and limits between 0 and 255 the value so obtained.

Figure 2:
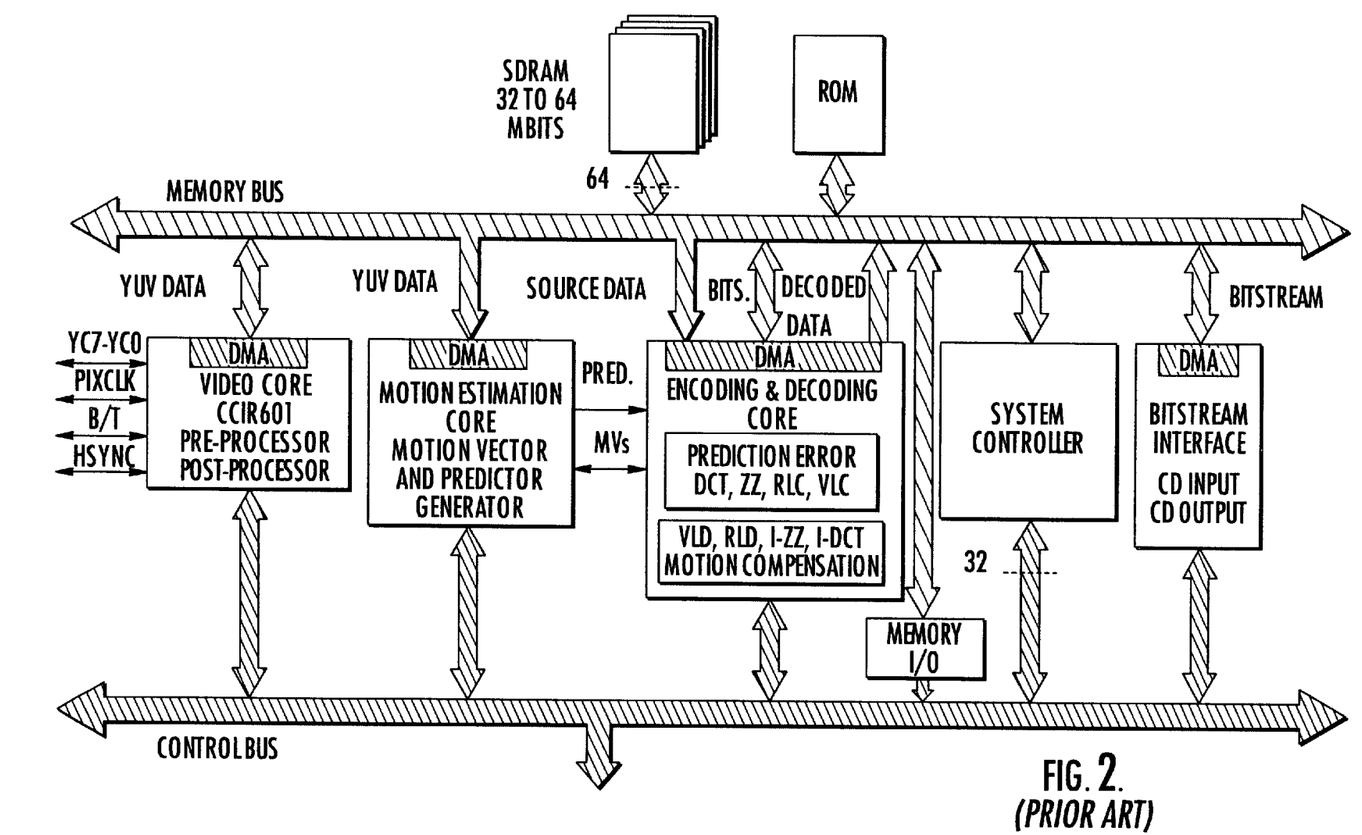
FIG. 2 shows the architectural scheme of the MPEG2 decoder device in accordance with the prior art.

The arrangement of the functional blocks depicted in FIG. 1 within an architecture implementing the above-described coder is shown in FIG. 2. A distinctive feature is that the frame ordinator block, the motion compensation block for storing the already reconstructed P and I pictures, and the multiplexor and buffer block for storing the bitstream produced by the MPEG-2 coding are integrated in memory devices external to the integrated circuit of the core of the coder. The decoder accesses these memory devices through a single interface suitably managed by an integrated controller.

Moreover, the preprocessing block converts the received pictures from the format 4:2:2 to the format 4:2:0 by filtering and subsampling the chrominance. The post-processing block implements a reverse function during the decoding and displaying phase of the pictures.

During the coding phase, decoding functions are also employed for generating the reference frames for the motion estimation. For example, the first I picture is coded, then decoded, stored (reference the motion compensation and storage block) and used for calculating the prediction error that will be used to code the successive P and B pictures.

The play-back phase of the data stream precedingly generated by the coding process uses only the inverse functional blocks (I-VLC, I-Q, I-DCT, etc.), never the direct functional blocks. From this point of view, it may be said that the coding and the decoding performed for displaying the pictures are nonconcurrent processes within the integrated architecture.

The pre-requisites of a MPEG2 coder will now be discussed. As already described in patent applications EP No. 97830605.8 and EP No. 98830163.6, which are assigned to the assignee of the present invention. The algorithm of motion estimation, for what concerns the first step, makes available the i-th macroblock placed on the preceding Top and Bottom fields in a working memory having the size of a macroblock without any burden in terms of band occupation by the frame memory.

For what concerns the working memory, for example, a macroblock having the 4:2:0 format is made of 6 blocks of 64 pixels each, each pixel being coded with 8 bits. In particular, the proposed method has been optimized to work on the luminance component, therefore, each macroblock is made of 4 luminance blocks.

Figure 3:
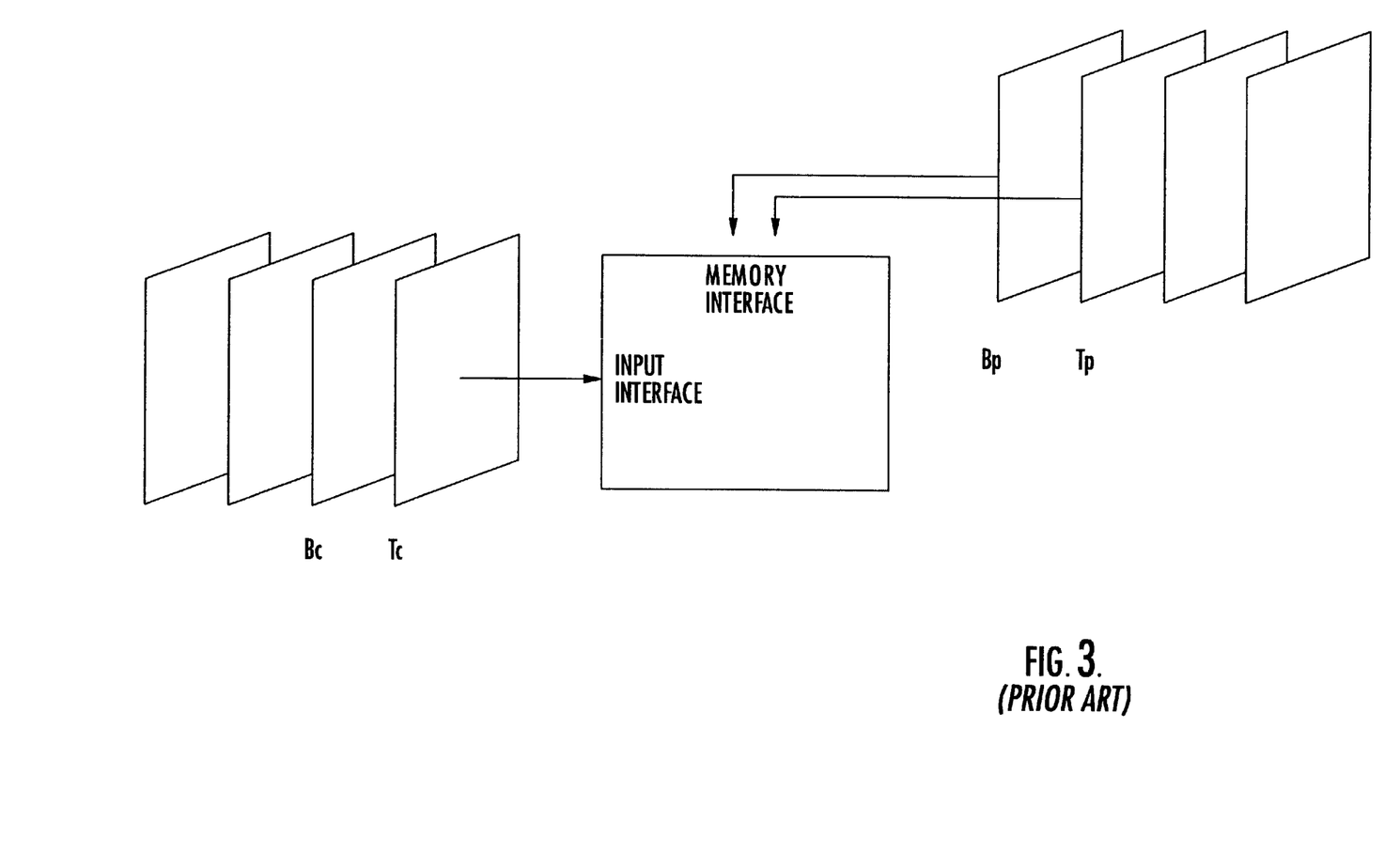
FIG. 3 shows a scheme highlighting the picture frame location in accordance with the prior art.

Referring to FIG. 3, from left to right there may be recognized pictures that will eventually reach the MPEG2 coder and those that are stored in the frame memory as already acquired pictures. Bc is the Bottom field of the current picture which will feed the coder. Tc is the Top field of the current picture which will feed the coder. Bp is the Bottom field of the preceding picture which is stored in the frame memory associated to the coder. Tp is the Top field of the preceding picture which is stored in the frame memory associated to the coder

SUMMARY OF THE INVENTION

In view of the foregoing background, an object of the present invention is to detect a progressive or interlaced content of a picture for improving the effectiveness of the coding of video sequences, especially in low cost applications. The effectiveness of the filtering applied on the chrominance component to the pictures input to the coder is improved.

Another object of the invention is to establish whether the picture decomposed in the fields Bc and Tc is progressive or interlaced.

These and other objects, features and advantages in accordance with the present invention are provided by a method for recognizing a progressive or interlaced content of video pictures during their processing in a coder. This is done by defining the Bottom field Bc of the current picture to enter the coder, and the Top field Tc of the current picture to enter the coder. The Bottom field Bp of the preceding picture already acquired by the coder is stored in the associated frame memory, and the Top field Tp of the preceding picture already acquired by the coder is stored in the associated frame memory. This establishes whether the current picture so decomposed in the fields Bc and Tc is progressive or interlaced. The method includes executing the following operations at least on one of the components (luminance or chrominance) of the video signal.

a) Defining a macroblock belonging to a frame of the preceding picture having dimensions R*S pixels, half of it is placed on the Top field Tp and the other half on the Bottom field Bp, each half having dimensions (R/2)*S.

b) For the chosen component of the video signal, calculating a first pair of coefficients (COEFF_1, COEFF_2) equivalent to the sum, extended to all the columns and to all the even rows of the macroblock, of the absolute values of the differences among the values assumed by the component of the video signal in the pixels of the same column and of consecutive rows belonging to the Top semi-frame and Bottom semi-frame, respectively, and the sum, extended to all the columns and to each fourth row of the macroblock, of the absolute values of the differences among the values assumed by the component of the video signal in the pixels of the same column and of consecutive rows of the same parity belonging to the Top semi-frame and Bottom semi-frame, respectively.

c) Verifying whether the first one of the coefficients of the pair is greater than or equal to a prefixed first real positive number of times ($\alpha$) of the second coefficient, incrementing a first counter (CONT_1) at each positive verification.

d) Incrementing a second counter (num_macroblock) at each macroblock so tested.

e) Calculating for each row of each Top semi-frame a second pair of coefficients (COEFF_3, COEFF_4) equivalent to for each row the sum, extended to all the columns of each semi-frame of the absolute values of the differences among the values assumed by the component of the video signal in pixels of the Bottom semi-frame of the preceding picture and of the Bottom semi-frame the current picture, belonging to the row following the considered row and to the same column, and the sum, extended to all the columns of each semi-frame of the absolute values of the differences among the values assumed by the component of the video signal in pixels of the same column and, respectively, of the row of the Top semi-frame of the preceding picture and the row following the considered row, belonging to the Bottom semi-frame of the current picture, respectively.

f) Verifying whether the second coefficient f the second pair is greater than or equal to a second prefixed real positive number of times ($\beta$) the first coefficient of the second pair, and incrementing a third counter (CONT_2) at each positive verification.

g) Incrementing a fourth counter (NUM_{+sc RIGHE}) at each row so tested verifying whether the content of the first counter (CONT_1) is greater than or equal to a third prefixed real positive number of times ($\gamma$) the content of second counter (NUM_{+sc MACROBLOCK}) and whether, at the same time, the content of the third counter (CONT_2) is greater than or equal to a fourth prefixed real positive number of times ($\delta$) the content of the fourth counter (NUM_{+sc RIGHE}). If so, the frame composed of the Top and Bottom semi-frame is considered an interlaced frame, and if not, the frame is a progressive one.

Preferably, the sums of paragraph e) are calculated after having discarded the first G and the last H rows of each semi-frame. G and H are prefixed integers whose sum is an integer multiple of the number of rows of the preceding macroblock.

Preferably, the sums of paragraph e) are calculated after having discarded the first I columns on the right and the last L columns on the left of each semi-frame. I and L are prefixed integers whose sum is an integer multiple of the number of columns of the preceding macroblock. The numbers I and L can be set equal to the number of columns of the preceding macroblock.

DETAILED DESCRIPTION OF THE PREFERRED EMBODIMENTS

Two picture frames will now be considered, with each one being decomposed in a couple of semi-frames. They include luminance and chrominance components. The recognition algorithm of the invention is applied only to the most energetic and richest information component, such as the luminance, for example. This luminance component can be represented by a matrix having N rows and M columns. Each semi-frame is divided in portions called macroblocks having R rows and S columns. The results of the division N/R and of M/S must be two integers, though not necessarily equal to each other.

Let $MBp(i,j)$ be a macroblock belonging to the preceding frame and whose first pixel at the top left corner is in the cross position between the i-th row and the j-th column. The pair (i,j) is characterized by i and j being an integer multiple respectively of R and S.

Figure 4:
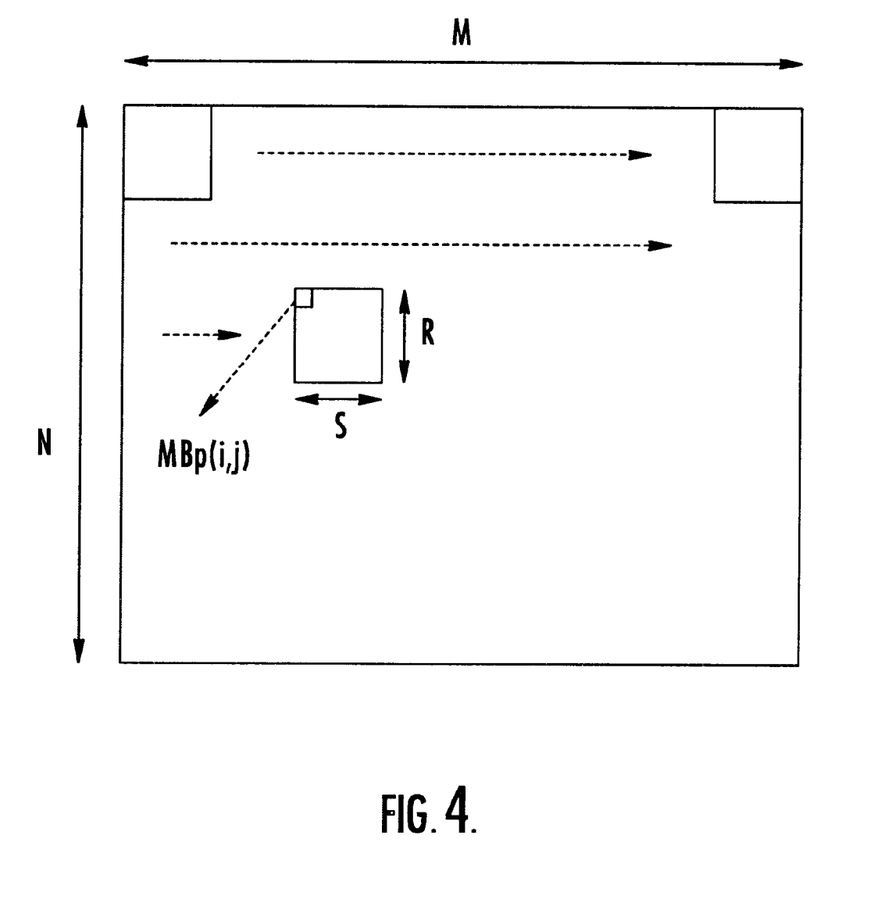
FIG. 4 illustrates the position of a certain macroblock on an image in accordance with the present invention.

FIG. 4 shows where the macroblock is placed on the picture, and the horizontal dashed arrows indicate the scanning order used to locate the macroblocks. In particular, the macroblock is made of two portions, each having dimensions (R/2)*S and placed on one of the two semi-frames, respectively.

Assume that $MBp(i,j)$ is projected on the current frame to obtain $Mbc(i,j)$. To illustrate an embodiment of the invention, 16×16 macroblocks are considered. Also, assume that MBp is made by the following information, as far as the luminance component is concerned:

$p_{0,0}$ $p_{0,1}$ $p_{0,2}$ $p_{0,3}$ $p_{0,4}$ $p_{0,5}$ $p_{0,6}$ $p_{0,7}$ $p_{0,8}$ $p_{0,9}$ $p_{0,10}$ $p_{0,11}$ $p_{0,12}$ $p_{0,13}$ $p_{0,14}$ $p_{0,15}$ /* line $i = 0$ */

$p_{1,0}$ $p_{1,1}$ $p_{1,2}$ $p_{1,3}$ $p_{1,4}$ $p_{1,5}$ $p_{1,6}$ $p_{1,7}$ $p_{1,8}$ $p_{1,9}$ $p_{1,10}$ $p_{1,11}$ $p_{1,12}$ $p_{1,13}$ $p_{1,14}$ $p_{1,15}$ /* line $i = 1$ */

$p_{2,0}$ $p_{2,1}$ $p_{2,2}$ $p_{2,3}$ $p_{2,4}$ $p_{2,5}$ $p_{2,6}$ $p_{2,7}$ $p_{2,8}$ $p_{2,9}$ $p_{2,10}$

-continued $$p_{2,11}\ p_{2,12}\ p_{2,13}\ p_{2,14}\ p_{2,15}\ /*\ \text{line}\ i=2*/$$

$$p_{3,0}\ p_{3,1}\ p_{3,2}\ p_{3,3}\ p_{3,4}\ p_{3,5}\ p_{3,6}\ p_{3,7}\ p_{3,8}\ p_{3,9}\ p_{3,10}$$

$$p_{3,11}\ p_{3,12}\ p_{3,13}\ p_{3,14}\ p_{3,15}\ /*\ \text{line}\ i=3*/$$

...

$$p_{15,0}\ p_{15,1}\ p_{15,2}\ p_{15,3}\ p_{15,4}\ p_{15,5}\ p_{15,6}\ p_{15,7}\ p_{15,8}\ p_{15,9}$$

$$p_{15,10}\ p_{15,11}\ p_{15,12}\ p_{15,13}\ p_{15,14}\ p_{15,15}\ /*\ \text{line}\ i=15*/$$

In particular the lines 0, 2 . . . 14 are placed on the semi-frame Tp, while the lines 1, 3 . . . 15 are placed on the semi-frame Bp. With reference to the lines, a first and a second coefficient are defined as follows:

$$\text{COEFF\_1}=\Sigma_{j=0,1,2\ldots 15}\ \Sigma_{i=0,4,8,12}\ \{\text{abs}[(p_{i,j})-(p_{i+1,j})]+\text{abs}[(p_{i+2,j})-(p_{i+3,j})]\}$$

$$\text{COEFF\_2}=\Sigma_{j=0,1,2\ldots 15}\ \Sigma_{i=0,4,8,12}\ \{\text{abs}[(p_{i,j})-(p_{i+2,j})]+\text{abs}[(p_{i+1,j})-(p_{i+3,j})]\}$$

Then the following test is performed. With α being a real positive number, and if COEFF_1 is greater than or equal to a times COEFF_2, a counter called CONT_1 is incremented. For each tested macroblock, a counter called NUM$_{+sc}$ MACROBLOCK is incremented.

Assume that the current frame is made of the following information, as far as the luminance component is concerned:

$$q_{0,0}\ q_{0,1}\ q_{0,2}\ q_{0,3}\ q_{0,4}\ \cdots\ q_{0,M-1}\ /*\ \text{line}\ i=0\ */$$

$$q_{1,0}\ q_{1,1}\ q_{1,2}\ q_{1,3}\ q_{1,4}\ \cdots\ q_{1,M-1}\ /*\ \text{line}\ i=1\ */$$

$$q_{2,0}\ q_{2,1}\ q_{2,2}\ q_{2,3}\ q_{2,4}\ \cdots\ q_{2,M-1}\ /*\ \text{line}\ i=2\ */$$

$$\vdots$$

$$q_{N-1,0}\ q_{N-1,1}\ q_{N-1,2}\ q_{N-1,3}\ q_{N-1,4}\ \cdots\ q_{N-1,M-1}\ /*\ \text{line}\ i=N-1\ */$$

To define a third and a forth coefficient, each coefficient is calculated on pixels of the current and preceding frame. A possible definition of the coefficients is obtained by discarding, for each pair of rows, the first and the last sixteen columns, respectively on the left and on the right side of each semi-frame, and the first and the last eight rows of each semi-frame. The following definitions are defined as follows:

$$\text{COEFF\_3}=\Sigma_{j=16,17,\ldots,M-17}\ \text{abs}[(q_{i+1,j})-(p_{i+1,j})]$$

(both placed on Bottom semi-frames)

$$\text{COEFF\_4}=\Sigma_{j=16,17,\ldots,M-17}\ \text{abs}[(q_{i+1,j})-(p_{i,j})]$$

(q is placed on the Bottom semi-frame, while p is placed on the Top semi-frame)

Then the following test is performed. With B being a real positive number, if COEFF_4 is greater than or equal to B times COEFF_3 a counter called CONT_2 is incremented. For each tested row, a counter called NUM$_{+sc\ RIGHE}$ is incremented. The variable i is incremented to the successive value of the sequence i=16, 18, 20, . . . , N–18.

Then the following test is performed. With γ being a real positive number, a determination is made to determine whether CONT_1 is greater than or equal to γ*NUM$_{+sc}$ MACROBLOCK. With δ being a real positive number, a determination is made to determine whether CONT_2 is greater than or equal to δ*NUM$_{+sc\ RIGHE}$.

If the two questions above have a positive answer then the frame composed of the semi-frame Tc and Bc is defined to be an interlaced one, otherwise, the frame is a progressive one.

The numbers α, β, γ, δ are prefixed to minimize the probability of erroneous recognizing of images as interlaced ones instead of as progressive ones, or viceversa. The above method of the invention is independent from the fact that the current and the preceding pictures are classified as I, P or B pictures according to the terminology used in an MPEG2 environment.

Figure 5:
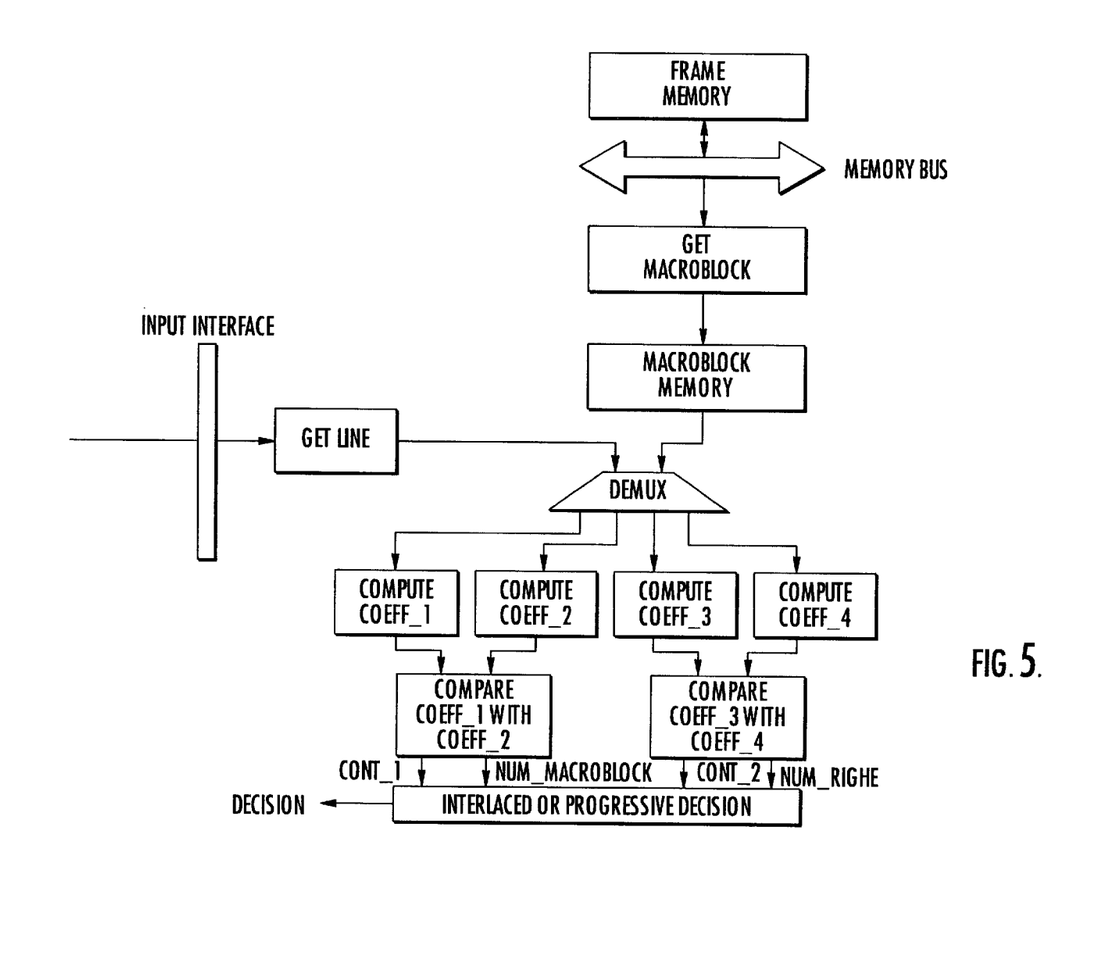
FIG. 5 is a block diagram of a detector for detecting a progressive or interlaced content of a video picture in accordance with the present invention.

The hardware architecture of the invention will now be discussed. FIG. 5 shows a general architectural scheme of a detector of the invention implemented in hardware form. The essential blocks are described below.

Get Macroblock. This block sequentially recovers the macroblocks from the external memory and places them in the internal working memory of the coder. This block scans the memory where the frame that precedes the one which is currently being fed to the device through the input interface of the coder. The scanning proceeds in a raster-scan order, i.e., from left to right and from the top to the bottom.

For example, this is done for the luminance component only, transferring each macroblock in a working memory (get_macroblock ( ) function), for processing it. Moreover, for the processing the luminance information contained in the line of the current field is also recovered from the external memory get_line( ) function.

Macroblock Memory. This is the working memory having a size appropriate to contain the luminance component of any noncoded macroblock, which is made of four blocks. Each block is defined by an 8×8 pixel matrix and each pixel is coded with 8 bits.

Demux. This block demultiplexes the information received at the input and transfers it to the computational blocks: Compute_Coeff1( ), Compute_Coeff2( ), Compute_Coeff3( ) and Compute_Coeff4( ). These blocks calculate the coefficients, as explained above. The tests performed on the coefficients as described above are thereafter performed and evaluated to decide whether the current frame must be considered having either a progressive or an interlaced content.

That which is claimed is:

1. A method for recognizing a progressive or an interlaced content of a video picture when processed in a coder, the method comprising:

a) defining a macroblock belonging to a frame of a preceding picture having a pixel dimension of R*S, half of the macroblock being placed on a top field of a preceding picture and the other half being placed on a bottom field of the preceding picture, each half having dimensions (R/2)*S;

b) selecting at least one of a luminance or chrominance component of the video signal, and calculating a first pair of coefficients on the selected component;

c) verifying if a first coefficient of the first pair of coefficients is greater than or equal to a first real positive number times a second coefficient of the first pair of coefficients, and incrementing a first counter at each positive verification;

d) incrementing a second counter at each macroblock being tested;

e) calculating for each row of each top semi-frame a second pair of coefficients;

f) verifying whether a second coefficient of the second pair of coefficients is greater than or equal to a second real positive number times a first coefficient of the second pair of coefficients, and incrementing a third counter at each positive verification;

g) incrementing a fourth counter at each row tested; and h) verifing whether a content of the first counter is greater than or equal to a third real positive number times a content of the second counter and whether, at a same time, a content of the third counter is greater than or equal to a fourth real positive number times a content of the fourth counter, and if so, then a frame composed of top and bottom semi-frames of the current picture is an interlaced frame, and if not, then the frame is a progressive frame.

2. A method according to claim 1, further comprising:

defining a bottom field of the current picture to enter the coder, and a top field of the current picture to enter the coder; and defining the bottom field of the preceding picture already acquired by the coder and stored in an associated frame memory, and the top field of the preceding picture already acquired by the coder and stored in the associated frame memory.

3. A method according to claim 1, wherein calculating the first pair of coefficients in step b) comprises:

calculating a sum for the first coefficient of the first pair of coefficients, extended to all columns and to all even rows of the macroblock, of absolute values of differences among values assumed by the selected component of the video signal in pixels of a same column and of consecutive rows belonging to the top semi-frame and the bottom semi-frame, respectively; and calculating a sum for the second coefficient of the first pair of coefficients, extended to all the columns and to each fourth row of the macroblock, of the absolute values of the differences among the values assumed by the selected component of the video signal in the pixels of the same column and of consecutive rows of a same parity belonging to the top semi-frame and the bottom semi-frame, respectively.

4. A method according to claim 1, wherein calculating the second pair of coefficients in step e) comprises:

calculating for each row a sum for the first coefficient of the second pair of coefficients, extended to all columns of each semi-frame of absolute values of differences among values assumed by the selected component of the video signal in pixels at the bottom semi-frame of the preceding picture and at the bottom semi-frame of the current picture, belonging to a row following a considered row and to a same column; and calculating a sum for the second coefficient of the second pair of coefficients, extended to all the columns of each semi-frame of the absolute values of the differences among the values assumed by the selected component of the video signal in pixels of the same column and, respectively, of a row of the top semi-frame of the preceding picture and a row following the considered row, belonging to the bottom semi-frame of the current picture, respectively.

5. A method according to claim 4, wherein the sums calculated in paragraph e) are calculated after having discarded a first G and a last H rows of each semi-frame, with G and H being integers whose sum is an integer multiple of the number of rows of the preceding macroblock.

6. A method according to claim 5, wherein G and H are set equal to half of the number of rows of the preceding macroblock.

7. A method according to claim 4, wherein the sums calculated in paragraph e) are calculated after having discarded a first I columns on a right of each semi-frame and a last L columns on a left of each semi-frame, with I and L being integers whose sum is an integer multiple of a number of columns of the preceding macroblock.

8. A method according to claim 7, wherein I and L are set equal to the number of columns of the preceding macroblock.

9. A method according to claim 1, wherein the video picture is processed in accordance with an MPEG2 standard.

10. A method for recognizing a progressive or an interlaced content of a video picture, the method comprising:

a) defining a macroblock belonging to a frame of a preceding picture, half of the macroblock being placed on a top field of a preceding picture and the other half being placed on a bottom field of the preceding picture;

b) selecting at least one of a luminance or chrominance component of the video signal, and calculating a first pair of coefficients on the selected component;

c) verifying if a first coefficient of the first pair of coefficients is greater than or equal to a first real positive number times a second coefficient of the first pair of coefficients, and incrementing a first counter at each positive verification;

d) incrementing a second counter at each macroblock being tested;

e) calculating for each row of each top semi-frame a second pair of coefficients;

f) verifying whether a second coefficient of the second pair of coefficients is greater than or equal to a second real positive number times a first coefficient of the second pair of coefficients, and incrementing a third counter at each positive verification;

g) incrementing a fourth counter at each row tested; and h) verifing contents of the first, second, third and fourth counters to determine if a frame composed of top and bottom semi-frames of the current picture is an interlaced frame or a progressive frame.

11. A method according to claim 10, wherein verifying in step h) verifies whether the content of the first counter is greater than or equal to a third real positive number times the content of the second counter and whether, at a same time, the content of the third counter is greater than or equal to a fourth real positive number times the content of the fourth counter, and if so, then the frame composed of the top and bottom semi-frames of the current picture is an interlaced frame, and if not, then the frame is a progressive frame.

12. A method according to claim 10, wherein the macroblock being defined in step a) has a pixel dimension of R*S, with each half having dimensions (R/2)*S.

13. A method according to claim 10, further comprising:

defining a bottom field of the current picture to enter the coder, and a top field of the current picture to enter the coder; and defining the bottom field of the preceding picture already acquired by the coder and stored in an associated frame memory, and the top field of the preceding picture already acquired by the coder and stored in the associated frame memory.

14. A method according to claim 10, wherein calculating the first pair of coefficients in step b) comprises:

calculating a sum for the first coefficient of the first pair of coefficients, extended to all columns and to all even rows of the macroblock, of absolute values of differences among values assumed by the selected component of the video signal in pixels of a same column and of consecutive rows belonging to the top semi-frame and the bottom semi-frame, respectively; and calculating a sum for the second coefficient of the first pair of coefficients, extended to all the columns and to each fourth row of the macroblock, of the absolute values of the differences among the values assumed by the selected component of the video signal in the pixels of the same column and of consecutive rows of a same parity belonging to the top semi-frame and the bottom semi-frame, respectively.

15. A method according to claim 10, wherein calculating the second pair of coefficients in step e) comprises:

calculating for each row a sum for the first coefficient of the second pair of coefficients, extended to all columns of each semi-frame of absolute values of differences among values assumed by the selected component of the video signal in pixels at the bottom semi-frame of the preceding picture and at the bottom semi-frame of the current picture, belonging to a row following a considered row and to a same column; and calculating a sum for the second coefficient of the second pair of coefficients, extended to all the columns of each semi-frame of the absolute values of the differences among the values assumed by the selected component of the video signal in pixels of the same column and, respectively, of a row of the top semi-frame of the preceding picture and a row following the considered row, belonging to the bottom semi-frame of the current picture, respectively.

16. A method according to claim 15, wherein the sums calculated in paragraph e) are calculated after having discarded a first G and a last H rows of each semi-frame, with G and H being integers whose sum is an integer multiple of the number of rows of the preceding macroblock.

17. A method according to claim 16, wherein G and H are set equal to half of the number of rows of the preceding macroblock.

18. A method according to claim 15, wherein the sums calculated in paragraph e) are calculated after having discarded a first I columns on a right of each semi-frame and a last L columns on a left of each semi-frame, with I and L being integers whose sum is an integer multiple of a number of columns of the preceding macroblock.

19. A method according to claim 18, wherein I and L are set equal to the number of columns of the preceding macroblock.

20. A method according to claim 10, wherein the video picture is processed in accordance with an MPEG2 standard.

21. A video detector for recognizing a progressive or an interlaced content of a video picture when processed in a coder, the video detector comprising:

a macroblock circuit for defining a macroblock belonging to a frame of a preceding picture, half of the macroblock being placed on a top field of a preceding picture and the other half being placed on a bottom field of the preceding picture;

a first computational circuit connected to said macroblock circuit for calculating a first pair of coefficients based upon a selected at least one of a luminance or chrominance component of the video signal, and for verifying if a first coefficient of the first pair of coefficients is greater than or equal to a first real positive number times a second coefficient of the first pair of coefficients;

a first counter connected to said first computational circuit and being incremented at each positive verification of said first computational circuit;

a second counter connected to said first computational circuit and being incremented for at each macroblock being tested;

a second computational circuit connected to said macroblock circuit for calculating for each row of each top semi-frame a second pair of coefficients, and for verifying whether a second coefficient of the second pair of coefficients is greater than or equal to a second real positive number times a first coefficient of the second pair of coefficients;

a third counter connected to said second computational circuit and being incremented at each positive verification of said second computational circuit;

a fourth counter connected to said second computational circuit and being incremented at each row tested; and a decision circuit for verifying contents of said first, second, third and fourth counters to determine if the frame composed of top and bottom semi-frames of the current picture is an interlaced frame or a progressive frame.

22. A video detector according to claim 21, wherein said decision circuit verifies whether the content of said first counter is greater than or equal to a third real positive number times the content of said second counter and whether, at a same time, the content of said third counter is greater than or equal to a fourth real positive number times the content of said fourth counter, and if so, then the frame composed of the top and bottom semi-frames of the current picture is an interlaced frame, and if not, then the frame is a progressive frame.

23. A video detector according to claim 21, wherein said macroblock circuit defines the macroblock having a pixel dimension of R*S, with each half having dimensions (R/2) *S.

24. A video detector according to claim 21, further comprising a frame memory connected to said macroblock circuit and to said first and second computational circuits; and wherein said macroblock defines the bottom field of the current picture to enter the coder, and the top field of the current picture to enter the coder, and defines the bottom field of the preceding picture already acquired by the coder and stored in said frame memory, and the top field of the preceding picture already acquired by the coder and stored in said frame memory.

25. A video detector according to claim 21, wherein said first computational circuit calculates the first pair of coefficients by performing the following calculations:

a sum for the first coefficient of the first pair of coefficients, extended to all columns and to all even rows of the macroblock, of absolute values of differences among values assumed by the selected component of the video signal in pixels of a same column and of consecutive rows belonging to the top semi-frame and the bottom semi-frame, respectively; and a sum for the second coefficient of the first pair of coefficients, extended to all the columns and to each fourth row of the macroblock, of the absolute values of the differences among the values assumed by the selected component of the video signal in the pixels of the same column and of consecutive rows of a same parity belonging to the top semi-frame and the bottom semi-frame, respectively.

26. A video detector according to claim 21, wherein said second computational circuit calculates the second pair of coefficients by performing the following calculations:

for each row a sum for the first coefficient of the second pair of coefficients, extended to all columns of each semi-frame of absolute values of differences among values assumed by the selected component of the video signal in pixels at the bottom semi-frame of the preceding picture and at the bottom semi-frame of the current picture, belonging to a row following a considered row and to a same column; and a sum for the second coefficient of the second pair of coefficients, extended to all the columns of each semi-frame of the absolute values of the differences among the values assumed by the selected component of the video signal in pixels of the same column and, respectively, of the row of the top semi-frame of the preceding picture and the row following the considered row, belonging to the bottom semi-frame of the current picture, respectively.

27. A video detector according to claim 26, wherein the sums calculated are calculated after having discarded a first G and a last H rows of each semi-frame, with G and H being integers whose sum is an integer multiple of the number of rows of the preceding macroblock.

28. A video detector according to claim 27, wherein G and H are set equal to half of the number of rows of the preceding macroblock.

29. A video detector according to claim 26, wherein the sums calculated are calculated after having discarded a first I columns on a right of each semi-frame and a last L columns on a left of each semi-frame, with I and L being integers whose sum is an integer multiple of the number of columns of the preceding macroblock.

30. A video decoder according to claim 29, wherein I and L are set equal to the number of columns of the preceding macroblock.

31. A video decoder according to claim 21, wherein the video picture is processed in accordance with an MPEG2 standard.

\* \* \* \* \*

UNITED STATES PATENT AND TRADEMARK OFFICE
CERTIFICATE OF CORRECTION

PATENT NO. : 6,545,727 B1
DATED : April 8, 2003
INVENTOR(S) : Danilo Pau, Luca Pezzoni Fabrizio Rovati and Daniele Sirtori It is certified that error appears in the above-identified patent and that said Letters Patent is hereby corrected as shown below:

<u>Title page,</u>
Item [74], *Attorney, Agent or Firm,* delete "Allen, Dyer, Doppelt, Milbrath & Gilchrist, P.A." insert -- Allen, Dyer, Doppelt, Milbrath & Gilchrist, P.A.; Lisa K. Jorgenson --

<u>Column 2,</u>
Line 17, delete "blocks" insert -- block --
Line 26, delete "Biredictionally" insert -- Biredirectionally --

<u>Column 3,</u>
Line 16, delete "overfiled" insert -- overfilled --

<u>Column 5,</u>
Line 39, delete "semi-frame the" insert -- semi-frame of the --
Line 49, delete "coefficient f the" insert -- coefficient of the --
Line 54, delete "($NUM\_{+sc\ RIGHE}$)" insert -- (NUM_RIGHE) --
Line 58, delete "second counter ($NUM\_{+sc\ MACROBLOCK}$)" insert -- the second counter (NUM_MACROBLOCK) --
Line 62, delete "($NUM\_{+sc\ RIGHE}$)" insert -- (NUM_RIGHE) --

<u>Column 7,</u>
Line 24, delete "a times" insert -- $\alpha$ times --
Lines 25-26, delete "$NUM\_{+sc\ MACROBLOCK}$" insert -- NUM_MACROBLOCK --
Line 59, delete "$NUM\_{+sc\ RIGHE}$" insert -- NUM_RIGHE --
Line 64, delete "$\gamma*NUM\_{+sc\ MACROBLOCK}$" insert -- $\gamma$*NUM_MACROBLOCK --
Line 67, delete "$\delta*NUM\_{+sc\ RIGHE}$" insert -- $\delta$*NUM_RIGHE --

UNITED STATES PATENT AND TRADEMARK OFFICE
CERTIFICATE OF CORRECTION

PATENT NO. : 6,545,727 B1
DATED : April 8, 2003
INVENTOR(S) : Danilo Pau, Luca Pezzoni Fabrizio Rovati and Daniele Sirtori It is certified that error appears in the above-identified patent and that said Letters Patent is hereby corrected as shown below:

Column 12,
Line 5, delete "incremented for at" insert -- incremented at --

Signed and Sealed this

Thirtieth Day of September, 2003

JAMES E. ROGAN
*Director of the United States Patent and Trademark Office*